(12) United States Patent
Blanchet (10) Patent No.: US 7,657,642 B2
(45) Date of Patent: Feb. 2, 2010

(54) IP NETWORK NODE AND MIDDLEWARE FOR ESTABLISHING CONNECTIVITY TO BOTH THE IPV4 AND IPV6 NETWORKS

(75) Inventor: Marc Blanchet, St-Augustin (CA)

(73) Assignee: Hexago, Inc., Ste-Foy (CA)

( * ) Notice: Subject to any disclaimer, the term of this patent is extended or adjusted under 35 U.S.C. 154(b) by 950 days.

(21) Appl. No.: 10/740,667

(22) Filed: Dec. 22, 2003

(65) Prior Publication Data

US 2005/0138166 A1  Jun. 23, 2005

(51) Int. Cl.
 G06F 15/16 (2006.01)
 G06F 15/173 (2006.01)
 G06F 15/177 (2006.01)
(52) U.S. Cl. .................... 709/230; 709/227; 709/203
(58) Field of Classification Search ......... 709/227–232, 709/203
 See application file for complete search history.

(56) References Cited

U.S. PATENT DOCUMENTS

| | | | | |
|---|---|---|---|---|
| 6,580,717 | B1 | 6/2003 | Higuchi et al. | 370/401 |
| 7,305,481 | B2 * | 12/2007 | Blanchet et al. | 709/230 |
| 2001/0040895 | A1 | 11/2001 | Templin | 370/466 |
| 2001/0047407 | A1 | 11/2001 | Moore et al. | 709/223 |
| 2002/0026527 | A1 | 2/2002 | Das et al. | 709/245 |
| 2002/0039357 | A1 | 4/2002 | Lipasti et al. | 370/338 |
| 2002/0069278 | A1 * | 6/2002 | Forslow | 709/225 |
| 2002/0161879 | A1 | 10/2002 | Richard | 709/223 |
| 2003/0088702 | A1 | 5/2003 | Iwata et al. | 709/245 |
| 2003/0225911 | A1 | 12/2003 | Lee et al. | 709/245 |
| 2004/0013130 | A1 * | 1/2004 | Blanchet et al. | 370/466 |
| 2004/0133672 | A1 * | 7/2004 | Bhattacharya et al. | 709/224 |

FOREIGN PATENT DOCUMENTS

| | | |
|---|---|---|
| WO | WO 03/041365 | 5/2003 |
| WO | WO 03/084184 | 10/2003 |
| WO | WO 03/084185 | 10/2003 |

\* cited by examiner

*Primary Examiner*—Haresh N Patel
(74) *Attorney, Agent, or Firm*—Goudreau Gage Dubuc (57) ABSTRACT

An Internet Protocol (IP) network node attempts to establish and maintain connectivity to both the Internet Protocol version 4 (IPv4) and Internet Protocol version 6 (IPv6) networks on initialization of one of the operating system and a program application. The IP node includes program instructions for determining IP addresses of all network interfaces associated with the node; program instructions for identifying all usable Internet protocols available on the node; program instructions for determining whether one of IPv4 and IPv6 are usable for communications with other IP nodes; and program instructions for establishing a tunnel through one of the IPv4 and IPv6 networks to a gateway for the other of IPv4 an IPv6 networks if the program instructions determine that either one of the IPv4 and IPv6 networks are not usable for communications with the other IP nodes.

27 Claims, 6 Drawing Sheets

IP NETWORK NODE AND MIDDLEWARE FOR ESTABLISHING CONNECTIVITY TO BOTH THE IPV4 AND IPV6 NETWORKS

CROSS-REFERENCE TO RELATED APPLICATIONS

This is the first application filed for the present invention.

MICROFICHE APPENDIX

Not Applicable.

TECHNICAL FIELD

The present invention relates in general to communications networks, and in particular to communications in Internet Protocol networks in transition from Internet Protocol version 4 to Internet Protocol version 6.

BACKGROUND OF THE INVENTION

Internet Protocol (IP) is a communications protocol that has been widely accepted as a preferred method of communicating information between both fixed and mobile devices. IP is a packet-based communication protocol in which addressed packets are forwarded by packet routers to receiving devices. Internet Protocol version 4 is currently the most widely deployed version of IP. However, the broad acceptance of IP has placed considerable strain on the 32-bit addressing scheme available in IPv4. IPv4 addresses are now substantially exhausted. Much of the developing world has no access to the IPv4 address base. Consequently, the Internet Engineering Tasked Force (IETF) developed a new Internet Protocol Standard (RFCs 2460). Among other improvements, IPv6 extends the Internet Protocol address to a 128 bit value. IPv6 makes available adequate address space for the foreseeable future.

Figure 1:
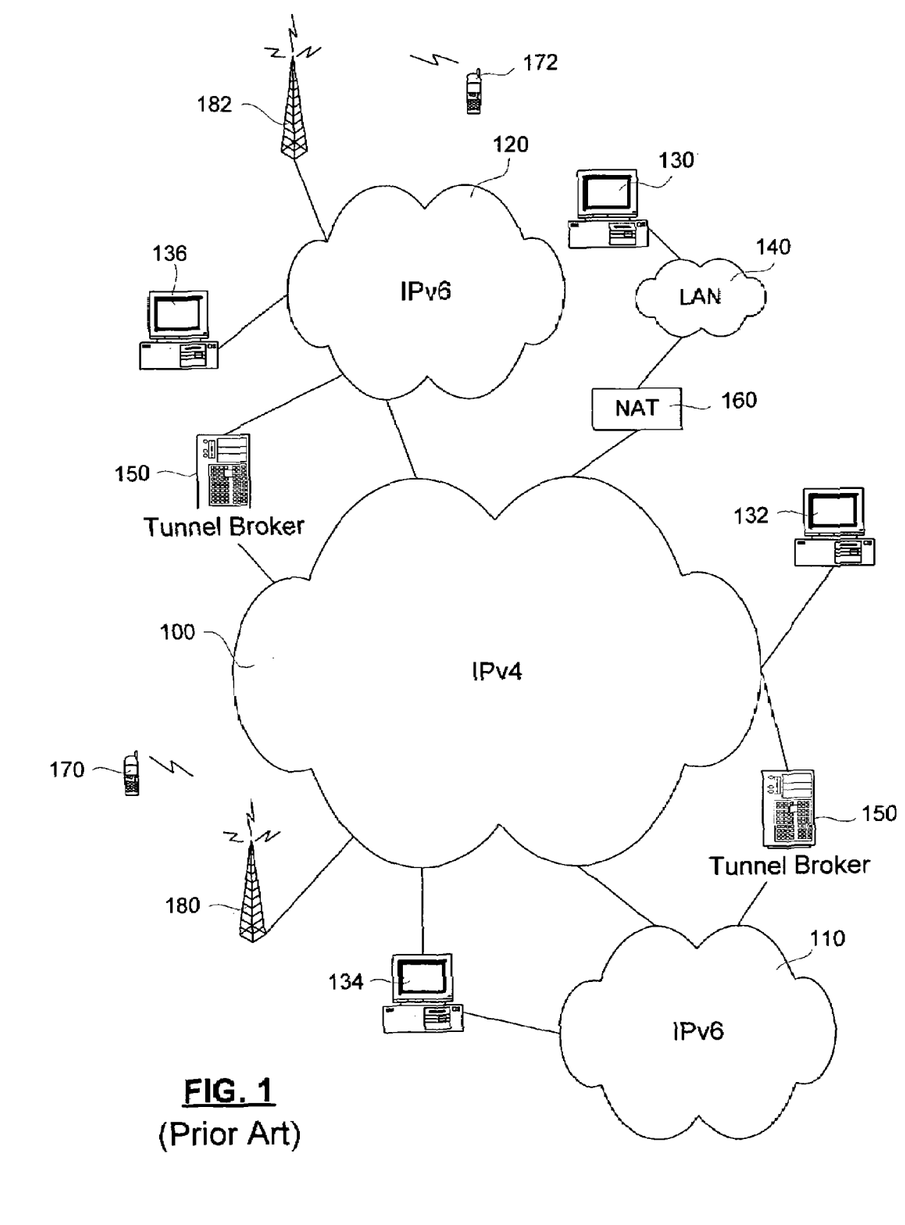
FIG. 1 is schematic diagram of a prior art IP network and exemplary devices connected to the IP network.

FIG. 1 is a schematic diagram of the current IP network, and a few exemplary devices its supports. As shown, a legacy IPv4 network 100 is interconnected (by gateways well known in the art) to isolated IPv6 networks 110, 120. The IPv4 network 100 supports a plurality of nodes such as nodes 130, 132, 134. The IPv6 network 110 also supports a plurality of nodes such as nodes 134, 136. The nodes are connected to the respective IP networks in many known ways, including via Internet service providers, and local area networks (LANs), such as LAN 140, through which IP node 130 accesses the IP network.

In order to facilitate routing across IP networks, tunnel protocols have been defined. Tunnel protocols exist to define paths for data traffic in accordance with provisioned parameters (bit rate, security, etc.) over IPv4 networks, in a manner well known in the art. Similarly, tunnel protocols have been specified for IPv6. Tunnel brokers 150 (two shown) have been used to permit tunnels to be set up across IPv4 and IPv6 networks. Tunnel brokers 150 generally do not form a part of the inter-network path over which the tunnel is defined, but rather are instrumental in dynamically establishing tunnels between two or more connected IP networks.

As will be appreciated by those skilled in the art, many LANs and various other private computer networks employ firewalls etc. that include the functionality of a network address translator (NAT) 160. NATs are known for extending addressing capabilities of a network by permitting a connected private network (e.g. LAN 140) to use a private addressing scheme that may conflict with address assignment in the public network (e.g. IPv4 network 100). The NAT 160 maintains a table associating LAN originating addresses with IPv4 destination addresses so that on receipt of a reply message from the IPv4 network 100, the NAT can match the origination address of the reply message with destination addresses in the table to identify the LAN 140 address to which the message should be routed.

The growth of wireless web-enabled devices (personal digital assistants (PDAs), and other wireless web browsers, 3-G and 4-G cellular phones, wireless Application Protocol (WAP) devices etc.) generates a considerable demand for IPv4 and IPv6 network access. In a manner well known in the art, web-enabled cell phones 170, 172 access IPv4 network 100/IPv6 network 120 via respective transceivers 180, 182, respectively.

It is well known that IPv4 and IPv6 are not compatible because of the differences in address space. IPv4 and IPv6 networks can only be interconnected through gateway nodes provisioned with both IPv4 and IPv6 network stacks. Nonetheless, because of the current lack of available IPv4 address space, IPV6 networks are being deployed and connected to the IPv4 network. As the conversion to IPv6 continues, more and more new service offerings are becoming available only in the IPv6 networks space. At the same time, most available legacy service offerings are enabled only in the IPv4 network.

Consequently, a great deal of effort has gone into developing ways to permit IPv6 devices to communicate through the IPv4 network (as described in applicant's U.S. patent application Ser. No. 10/1935396 filed Jul. 16, 2002 entitled METHOD AND APPARATUS FOR CONNECTING IPV6 DEVICES THROUGH AN IPV4 NETWORK USING A TUNNELING PROTOCOL; and applicant's U.S. patent application Ser. No. 10/337428 filed Jan. 7, 2003 and entitled METHOD AND APPARATUS FOR CONNECTING IPV6 DEVICES THROUGH IPV4 NETWORK AND A NETWORK ADDRESS TRANSLATOR).

Methods have also been developed for connecting IPv4 devices through an IPv6 network using a tunnel setup protocol. For example, U.S. patent application Ser. No. 10/286137 filed Nov. 1, 2002 describes a method and apparatus for connecting IPv4 devices through an IPv6 network using a tunnel setup protocol. However, as the IPv6 network is increasingly deployed, the requirement for communications with devices in both the IPv4 and IPv6 networks increases because many services available in either IPv4 or IPv6 are not being made available in the other network.

Efforts have therefore been made to permit IPv6 nodes to connect to nodes in the IPv4 network. For example, International Application Number PCT/GB03/01256 teaches an address resolver system that assists a node in an IPv6 network to select an address for connectivity to a node in an IPv4 network when both DSTM and NAT-PT transition mechanisms are available. The address resolver determines capabilities of the node and an application that requested a connection in order to select a most appropriate transition mechanism.

Although it is desirable that all IP nodes be provided with both an IPv4 and an IPv6 stack, simple provision of a dual stack does not solve the problem of connectivity. Neither IPv4 nor IPv6 are ubiquitously available. Consequently, even dual stack devices are often unable to communicate with both the IPv4 and IPv6 networks at any time that communications is desired.

There therefore exists a need for an IP network node that automatically and autonomously establishes connectivity to both the IPv4 and IPv6 networks.

SUMMARY OF THE INVENTION

It is therefore an object of the invention to provide an IP network node for automatically and autonomously establishing connectivity to both the IPv4 and IPv6 networks.

The invention therefore provides an IP network node that attempts to establish and maintain connectivity to both the IPv4 and IPv6 networks. The node comprises program instructions for determining, on initialization of one of an operating system of the node and a program application executed by the node, the IP address of all network interfaces associated with the node. The node further comprises program instructions for identifying all usable Internet protocols available to the IP node and for determining whether one of the IPv4 and IPv6 are usable for communications with other IP nodes. The node further comprises program instructions for establishing a tunnel through one of the IPv4 and IPv6 networks to a gateway for the other of the IPv4 and IPv6 networks if the program instructions determine that either one of the IPv4 and IPv6 networks are not usable for communications with the other IP nodes.

The program instructions for determining whether one of the IPv4 and IPv6 are usable comprise program instructions for determining whether one of the IP addresses of all network interfaces associated with the node is one of an IPv4 and an IPv6 address. Other program instructions test a reachability of a network with which the one of the IPv4 and IPv6 address is associated by attempting to connect to a predetermined node in that network.

It is also necessary to determine whether the network node is behind a network address translator (NAT). Consequently, the IP node further comprises program instructions for determining whether the IPv4 or IPv6 addresses where translated by a gateway between the IP node and the network. This determination must be made because the existence of a NAT limits choices respecting the establishment of a tunnel to either the IPv4 or the IPv6 networks. After it's been determined whether the IP node is behind a NAT, a search for a networking protocol to establish the tunnel is begun. The order of a search is a matter of design choice. In accordance with one embodiment of the invention, the search is conducted in an order in which the IP node first attempts to secure a connection with a tunnel setup protocol tunnel broker in order to establish the required tunnel. If a tunnel setup protocol tunnel broker is not available, it is determined whether the node is 6to4, ISATAP, or Dual IP layer stack transition mechanism (DSTM) capable. A tunnel is then established in accordance with a first of the protocols determined to be available to the node.

The invention further provides middleware for an IP network node. The middleware comprises executable code for determining on initial execution of a given program application by the node, IP addresses of all network interfaces associated with the node. Middleware further comprises executable code for identifying all usable Internet protocols available on the node, and for determining whether one of IPv4 and IPv6 are usable for communications with other IP nodes in respective IPv4 and IPv6 networks. Middleware further comprises executable code for establishing a tunnel through one of the IPv4 and IPv6 networks to a gateway for the other of IPv4 and IPv6 networks if the middleware determines that either one of the IPv4 and IPv6 networks are not usable for communications with the other IP nodes in the respective network.

The invention further comprises a computer readable modulated carrier signal, and means embedded in the signal for establishing the IP node in accordance with the invention.

The invention likewise provides an article comprising a computer readable modulated carrier signal and means embedded in the carrier signal for establishing the middleware in accordance with the invention.

The invention likewise provides a product comprising a computer readable memory for storing program instructions for establishing either one of the IP nodes in accordance with the invention and the middleware in accordance with the invention.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

This invention provides an IP node for automatically and autonomously establishing functional connections to both the IPv4 and the IPv6 networks when the IP node is initialized for service; or when an application requiring dual connectivity is launched. The IP node may be configured to automatically attempt to establish a connection to both the IPv4 and the IPv6 networks on initialization. Alternatively, middleware may be provided that functions to attempt to establish the connection to both the IPv4 and the IPv6 networks when an application is launched requiring dual connectivity. In either instance, the program instructions are executed to discover interfaces available to the IP device and connectivity associated with the respective interfaces. If one of IPv4 and IPv6 are found to be unusable, a search for a usable protocol for establishing a tunnel through the unavailable network is performed and a tunnel is set up to the unusable network using an available tunneling protocol. This permits IP nodes to access services only available in their non-native IP network.

Figure 2:
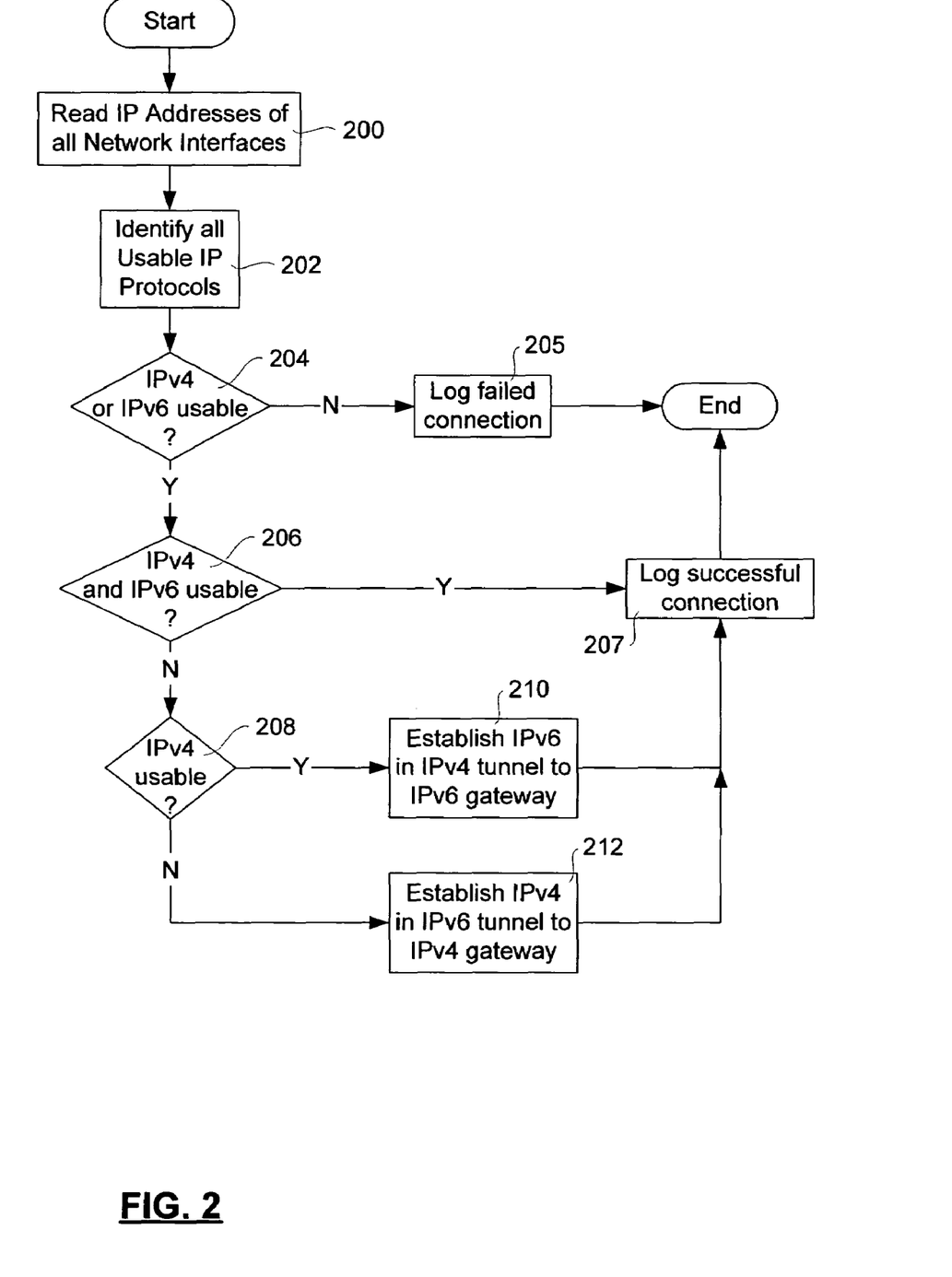
FIG. 2 is a flowchart illustrating a main line of program instructions enabling the IP node in accordance with the invention.

FIG. 2 is a flowchart illustrating a main line of programmed instructions for enabling an IP node and/or middleware in accordance with the invention. The method embodied in the program instructions may be executed on initialization of the IP node or on launch of an application requiring dual connectivity to both the IPv4 and IPv6 networks. As shown in FIG. 2, the program instructions first read IP addresses of all network interfaces (step 200) and identify all usable IP protocols.

A "usable" IP protocol is an IP protocol for which a stack is available and a network interface that has been assigned a corresponding IP address is located. Determining the usability of the IP protocols is explained below in more detail with reference to FIG. 3.

After all usable IP protocols are determined in step 202, it is determined whether either IPv4 or IPv6 are usable (step 204). If neither are usable, connection to any external IP network is impossible and the procedure ends. If either IPv4 or IPv6 is found to be usable, it is determined whether both IPv4 and IPv6 are usable (step 206). If both are usable, setting up a tunnel is unnecessary and the procedure also ends.

If both IPv4 and IPv6 are not found to be usable, it is determined in step 208 whether IPv4 is usable. If IPv4 is usable, an IPv6 in IPv4 tunnel to an IPv6 gateway is established (step 210). If IPv4 is found not to be usable in step 208, an IPv4 in IPv6 tunnel to an IPv4 gateway is established (step 212).

Figure 3:
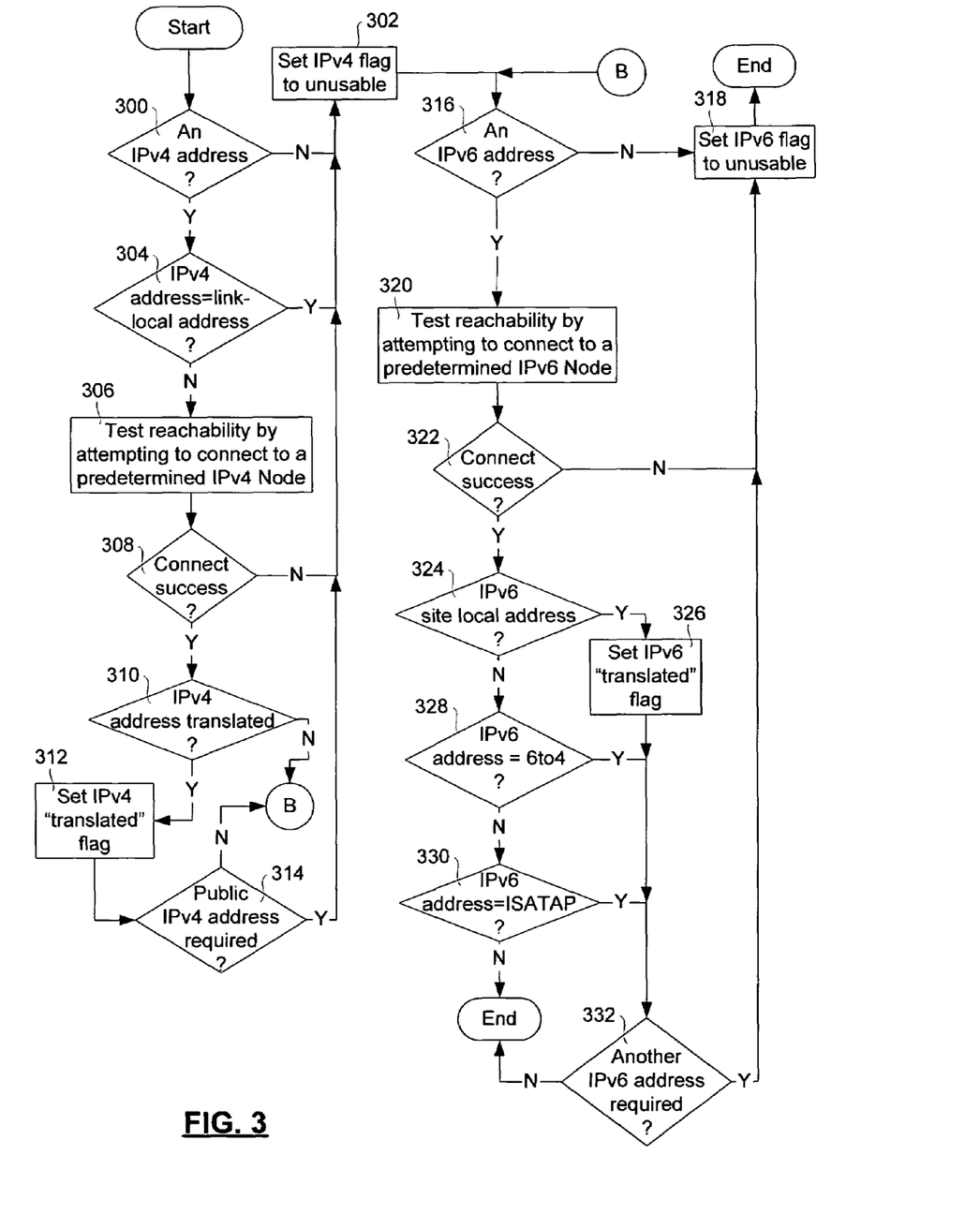
FIG. 3 is a flowchart illustrating a method embodied in program instructions for determining whether IPv4 and IPv6 are usable.

FIG. 3 illustrates the process for determining usable IP protocols associated with an IP node. In step 300 it is determined whether an IPv4 address is associated with any of the network interfaces available to the IP node. If an IPv4 address is not available, an "IPv4 unusable" flag is set (step 302). If an IPv4 address is available, it is determined in step 304 whether the IPv4 address is a link-local IPv4 address. Link-local IPv4 addresses are not suitable for communications with devices not directly connected to the same physical or (logical) link. They are only used where stable, routable addresses are not available, such as on ad hoc or isolated networks. Normally link-local IPv4 addresses and routable addresses are not configured simultaneously on the same interface. As described in RFC 2131, a host may automatically configure an interface with an IPv4 address in the 169.254/16 prefix that is valid for Link-Local communication on that interface.

Consequently, if the only IPv4 address is a link-local address the process ends at step 302. Otherwise, reachability using the IPv4 address is tested by attempting to connect to a predetermined IPv4 node (step 306). In accordance with an embodiment of the invention, the preferred node to which a connection is attempted is a tunnel setup protocol (TSP) tunnel broker 150 (see FIG. 1), although any other IP node may be used for the same purpose. In step 308, it is determined whether the connection attempt succeeded. If not, the IPv4 flag is set to unusable in step 302. If the connection succeeded, it is determined in step 310 whether the IPv4 address associated with the nodes interface were translated during the successful connection attempt. As is understood by those skilled in the art, a translation occurs if the IP node is behind a network address translator 160 (FIG. 1).

Network address translation is frequently built into routers and firewalls. A NAT receives each packet from an internal private network and modifies the IP header to include the global IP address of the router in the originating address field before the packet is transmitted into the Internet. The router stores the internal IP address of the originating node, destination IP address and port number in a NAT state table. When the request is returned to the same port from the destination IP address, the NAT matches the destination IP address with a stored destination address saved when the request was sent, and then modifies the IP header to insert a corresponding stored internal originating address as the destination address for the request. The NAT is therefore transparent to the IP node. If, however, the reachability test performed in step 306 is performed using a connect message sent to a TSP tunnel broker server 150, the tunnel broker server 150 is programmed to examine the connect message to determine whether an IPv4 source address of the connect message matches an IPv4 client address in the tunnel request message. If there is a match, an IPv6 in IPv4 tunnel can be established in the IPv4 network between the IP node and the tunnel broker 150. Consequently, the tunnel broker 150 returns an acknowledgement recommending that an IPv6-in-IPv4 tunnel be established, which is the most efficient and reliable tunnel protocol. If the two addresses do not match, the tunnel broker 150 recommends that an IPv6-in-(UDP/TCP) IPv4 tunnel be established, as explained in detail in applicant's above-referenced U.S. patent application Ser. No. 10/337428, which is incorporated herein by reference.

If it is determined that there is a network address translator between the IP node and the IPv4 network, an IPv4 "translated" flag is set in step 312. Subsequently, it is determined whether a public IPv4 address is required. A public IPv4 address may be required by certain applications, as is well understood by persons skilled in the art. If it is determined in step 314 that a public IPv4 address is required, the IPv4 flag is set to unusable in step 302.

The program instructions then examine the IPv6 capability of the IP node. In step 316 it is determined whether an IPv6 address has been configured on one of the interfaces of the IP node. If no IPv6 address is found, the IPv6 flag is set to unusable (step 318) and the process ends. If an IPv6 address is found to be configured on one of the interfaces of the IP node, reachability is tested (step 320) by attempting to connect to a predetermined IPv6 node using all IPv6 configured addresses. In one embodiment, the predetermined IPv6 node is a TSP tunnel broker in the IPv6 network. If the connection attempt is not successful, as determined in step 322, the IPv6 flag is sent to unusable (step 318) and the process ends. Otherwise, the IPv6 address is examined to determine whether it is a site local address. The IPv6 site local addressing is explained in RFC 3513.

If the only IPv6 address is a site local address, the IPv6 node is behind a network address translator and in step 326 the IPv6 NAT flag is set. If the IPv6 address is not a site local address, it is determined whether the IPv6 address is a 6to4 address (step 328). If it is a 6to4 address, the process branches to step 342 where it is determined if another IPv6 address is required by the application being run. If so, the IPv6 flag is set to unusable in step 318. If not, it is determined whether the IPv6 address is an Intra-Site Automatic Tunnel Addressing Protocol (ISATAP) address that connects IPv6 hosts and routers within IPv4 sites. ISATAP treats the site's IPv4 infrastructure as a link layer for IPv6 with no requirement for IPv4 multicast. ISATAP enables intra-site automatic IPv6-in-IPv4 tunneling whether globally assigned or private IPv4 addresses are used. ISATAP addressing is described in Intra-Site Automatic Tunnel Addressing Protocol (ISATAP) draft-ietf-ngtrans-isatap-14.txt dated Aug. 25, 2003. If the IP address is not an ISATAP address, the process ends. If the address is an ISATAP address it is determined whether another IPv6 address is required (step 342). If so, the IPv6 flag is set to unusable in step 312. Otherwise the process ends.

Figure 4A:
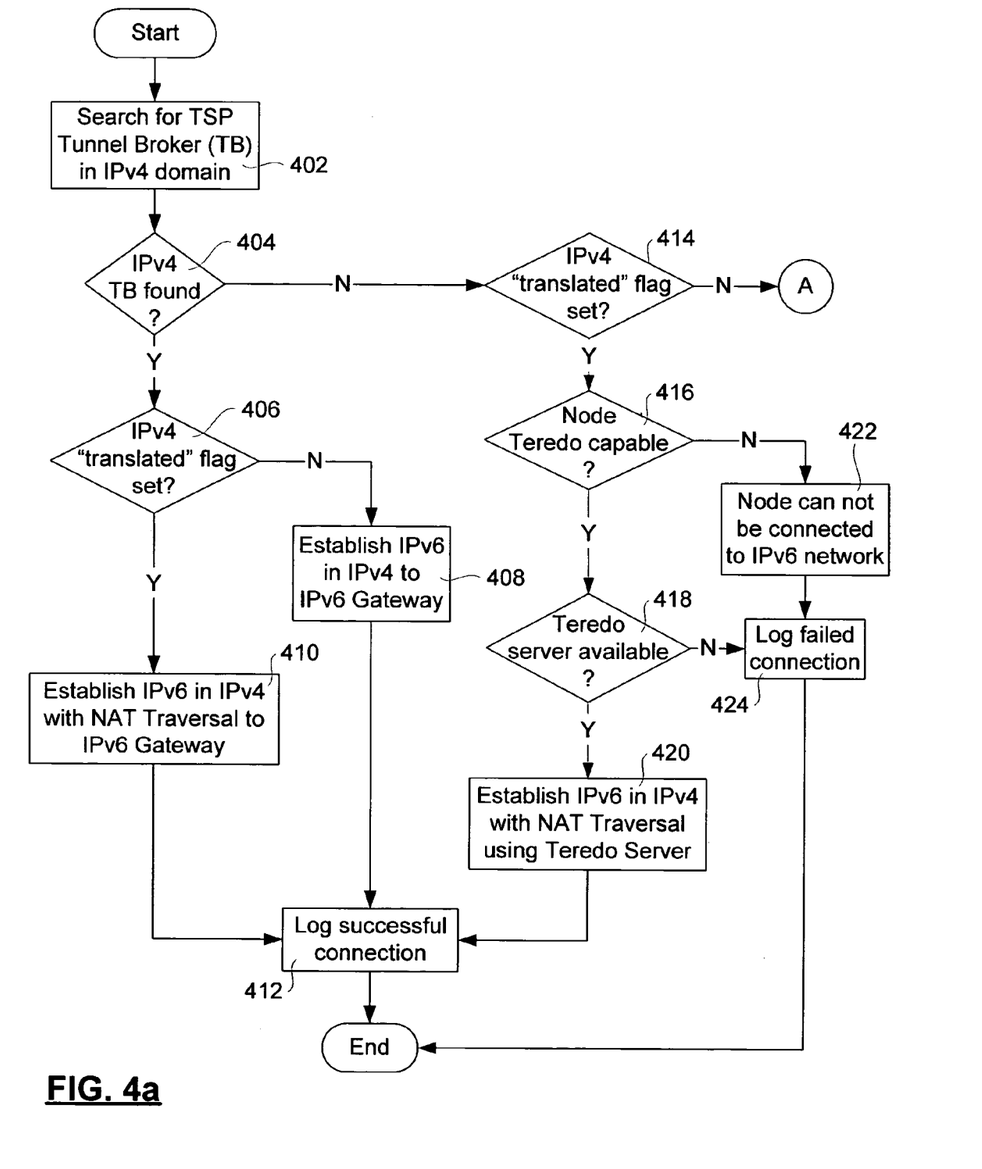
FIGS. 4a and 4b are a flowchart illustrating a method embodied in program instructions for establishing an IPv6 in IPv4 tunnel if it is determined that only the IPv4 network is usable.

FIG. 4a is a flowchart illustrating a process executed by program instructions when the IPv4 flag set in the process described above with reference to FIG. 3 is set to indicate that IPv4 is usable. In step 402, the IP node program instructions search for a tunnel setup protocol (TSP) tunnel broker (TB) in the IPv4 domain (step 402).

In step 404, it is determined whether an IPv4 tunnel broker has been found. If so, it is determined in step 406 whether the IPv4 translated flag has set (see step 312 of FIG. 3). If the IPv4 translated flag was set, an IPv6 in IPv4 tunnel with NAT traversal to an IPv6 gateway is established as described in applicant's above-referenced patent application (step 410). A successful connection is then logged in step 412. If it was determined in step 406 that the translated flag was not set, an IPv6 in IPv4 tunnel to an IPv6 gateway is established in step 408, as described in applicant's co-pending patent application Ser. No. 10/195396 filed 16 Jul. 2002. Subsequently, a successful connection is logged in step 412.

If it is determined in step 404 that an IPv4 tunnel broker cannot be found, the program instructions examine the IPv4 address translated flag to determine whether it is set to indicate that the IP node is behind a NAT (step 414). If the IP node is behind a NAT, and a TSP tunnel broker cannot be found, the only alternative for establishing a tunnel is Teredo. Teredo is an address assignment and automatic tunneling technology that provides unicast IPv6 connectivity across the IPv4 Internet, as described in Internet draft entitled "Teredo: Tunneling IPv6 Over UDP through NATs". If the node is determined to be Teredo capable (step 416), it is determined in step 414 whether a Teredo server is available in the IPv4 domain. If so, an IPv6 in IPv4 with NAT traversal using a Teredo tunnel is established (step 420). A successful connection is then logged in step 412 and the process ends.

If it is determined in step 416 that the IP node is not Teredo capable, the IP node cannot be connected to the IPv6 network (step 422) and a failed connection is logged in step 424.

Figure 4B:
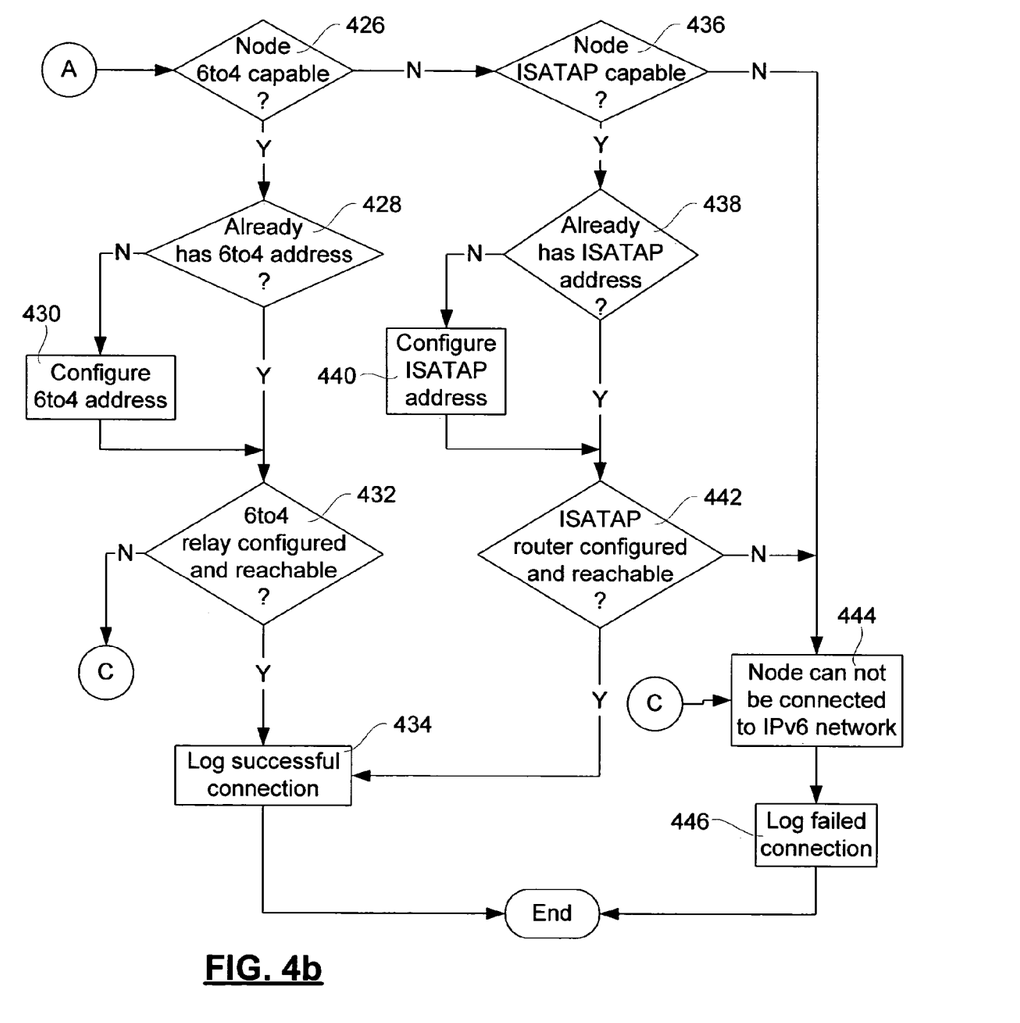

As shown in FIG. 4b, if it is determined in step 414 of FIG. 4a that the IPv4 address translated flag was not set, the program instructions determine whether the node is 6to4 capable (step 426). 6to4 is a well-defined automatic tunneling technology that provides unicast IPv6 connectivity across the IPv4 Internet. 6to4 routers use a public IPv4 address to construct a 6to4 prefix and act as IPv6 advertising and forwarding routers. The 6to4 router encapsulates and decapsulates IP traffic sent to and from the IP node. 6to4 addressing is described in RFC 3056.

If it is determined that the node is 6to4 capable, the program instructions ascertain whether the node already has a 6to4 address (step 428). If not, a 6to4 address must be configured (step 430). It is then determined whether a 6to4 relay is configured and reachable (step 432). If so, a successful connection is logged in step 434. If not, the node cannot be connected to the IPv6 network (step 444) and a failed connection is logged (step 446).

If it is determined in step 426 that the node is not 6to4 capable, the program instructions determine in step 436 whether the node is ISATAP capable. The Intra-Site Automatic Tunnel Addressing Protocol (ISATAP) enables incremental deployment of IPv6 within IPv4 sites. ISATAP allows dual-stack nodes that do not share a physical link with an IPv6 router to automatically tunnel packets to the IPv6 next-hop address through IPv4, i.e. the sites IPv4 infrastructure is used as a link layer for IPv6. As noted above, ISATAP is described in draft-ietf-ngtrans-isatap-14.txt dated Aug. 25, 2003.

If it is determined that the node is ISATAP capable, the program instructions determine in step 438 whether the IP node already has an ISATAP address. If the IP node does not have an ISATAP address, the address must be configured (step 440). It is then determined whether an ISATAP router is configured and reachable (step 442). If so, a successful connection is logged (step 434). If not, the IP node cannot be connected to the IPv6 network (step 444) and a failed connection is logged (step 446).

Figure 5:
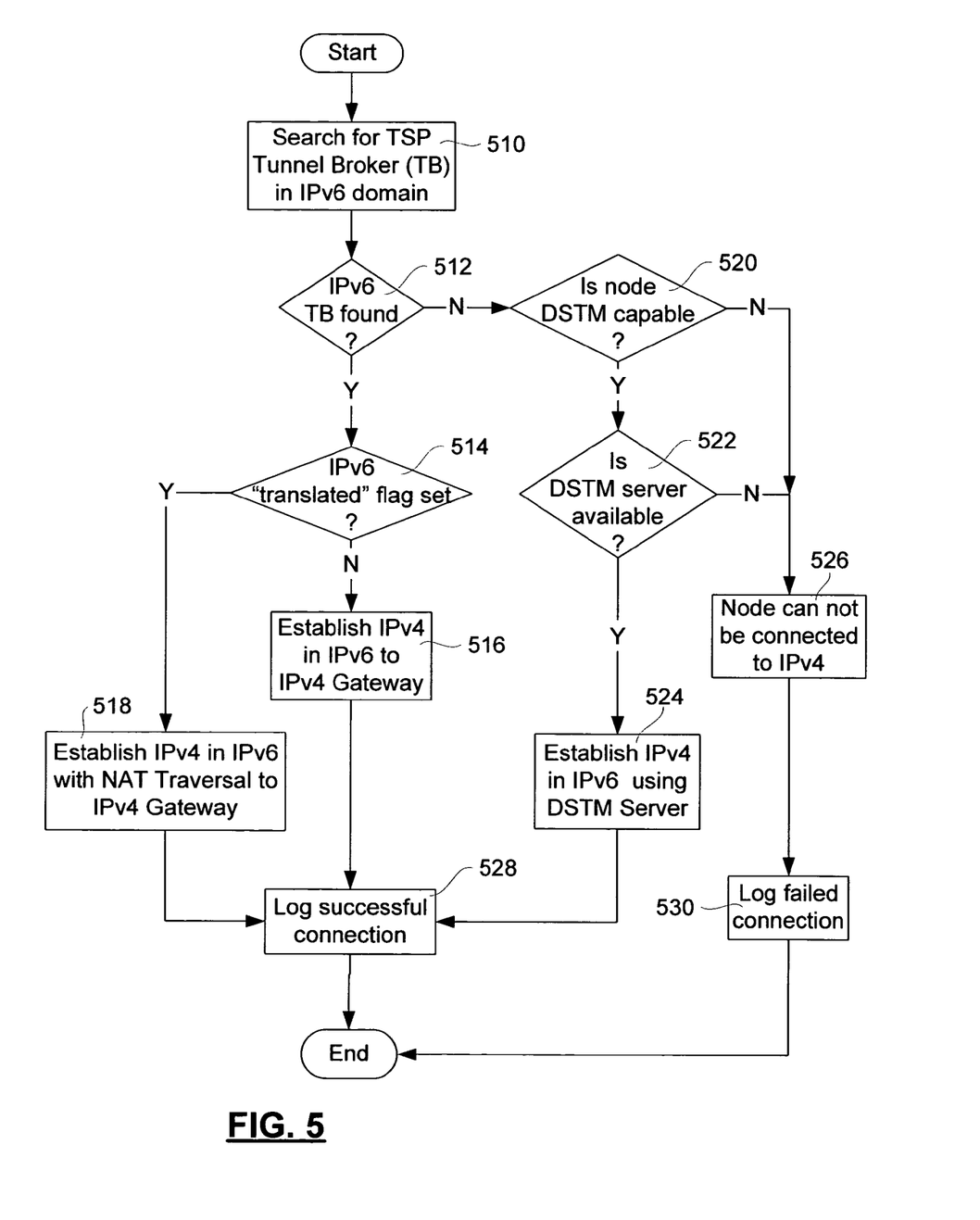
FIG. 5 is a flowchart illustrating a method embodied in program instructions for establishing an IPv4 in IPv6 tunnel when it is determined that only the IPv6 network is usable.

FIG. 5 is a flowchart detailing actions of the program instructions on the IP node if the IPv6 flag set in step 318 (FIG. 3) indicates that IPv6 is usable. In step 510, the program instructions direct the IP node to search for a TSP tunnel broker in the IPv6 domain. If a tunnel broker is found (step 512) it is determined in step 514 whether the address translated flag was set in step 326 (FIG. 3). If the address translated flag was not set, an IPv4 in IPv6 tunnel to an IPv4 gateway is established (step 516), and the process ends. If the IPv6 address translated flag was set (step 514), an IPv4 in IPv6 with NAT traversal to an IPv4 gateway is established (step 518), and the process ends.

If an IPv6 tunnel broker could not be found in step 512, it is determined in step 520 whether the IP node is Dual Stack Transition Mechanism (DSTM) capable. DSTM is an IPv4 to IPv6 transition proposal based on the use of IPv4 over IPv6 dynamic tunnels and the temporary arbitration of IPv4 global addresses to an IPv6-only host. Hosts are given a global IPv4 address on a temporary basis only when an application requires it.

If the IP node is DSTM capable, it is determined in step 522 whether a DSTM server is available. If so, an IPv4 in IPv6 tunnel is established using the DSTM server (step 524). If not, the node cannot be connected to IPv4 network and a failed connection is logged (step 530). The process then ends.

The IP nodes in accordance with the invention therefore automatically and autonomously attempt to provide full-time connectivity to both the IPv4 and IPv6 networks. Although the search for a connection mechanism described above indicates a particular order for the search, it will be understood by those skilled in the art that the order may be changed, and that other connection mechanisms are available or may become available to provide new options for the IPv4 to IPv6 transition.

The preferred embodiments described above are therefore intended to be exemplary only and the scope of the invention is intended to be limited solely by the scope of the appended claims.

I claim:

1. A method of establishing and maintaining connectivity between an Internet Protocol (IP) network node and both an Internet Protocol version 4 (IPv4) network and an Internet Protocol version 6 (IPv6) network, the method comprising steps of:

providing both an IPv4 compatible network stack and an IPv6 compatible network stack, each of said stacks capable of providing native access to respectively an I Pv4 network and an I Pv6 network;

determining, on initialization of one of an operating system of the node and a program application executed by the node, IP addresses of said network interfaces;

determining whether said IPv4 network stack is directly usable for communications with other IP nodes;

determining whether said IPv6 network stack is directly usable for communications with other IP nodes;

when said IPv4 network stack is not directly usable for communications with other IP nodes, establishing a tunnel through the IPv6 network to a gateway for the IPv4 network to thereby enable communications using IPv4 ; and when said IPv6 network stack is not directly usable for communications with other IP nodes, establishing a tunnel through the IPv4 network to a gateway for the IPv6 network to thereby enable communications using IPv6 ;

wherein the step of determining whether one of IPv4 network stack and IPv6 network stack are directly usable comprises step of:

determining whether one of the IP addresses of all network interfaces associated with the node is one of an IPv4 and an IPv6 address; and testing a reachability of a network with which the one of the IPv4 and IPv6 address is associated by attempting to connect to a predetermined node in the network.

2. The method as claimed in claim 1 further comprising a step of determining whether the one of the IPv4 and the IPv6 addresses are translated by a gateway between the IP node and the network.

3. The method as claimed in claim 2 further comprising a step of setting an "address translated" flag when the one of the IPv4 and the IPv6 addresses are translated by the gateway.

4. The method as claimed in claim 3 further comprising a step of determining whether another P address is required by the node to enable communications when the "address translated" flag is set.

5. The method as claimed in claim 4 further comprising a step of setting a corresponding one of an "IPv4 unusable" and "IPv6 unusable" flag when the "address translated" flag is set and another P address is required by the node to enable communications.

6. The method as claimed in claim 1 wherein the step of establishing a tunnel through one of IPv4 and IPv6 networks comprises a step of searching for a tunnel session protocol (TSP) tunnel broker in the one of the IPv4 and the IPv6 networks.

7. The method as claimed in claim 6 further comprising a step of establishing a tunnel through the network to a gateway to the other network using the TSP tunnel broker when the TSP tunnel broker is found.

8. The method as claimed in claim 7 further comprising a step of establishing the tunnel through a network address translator (NAT) when the "address translated" flag is set.

9. The method as claimed in claim 6 further comprising a step of determining whether the "address translated" flag is set when the TSP tunnel broker is not found.

10. The method as claimed in claim 9 further comprising a step of determining whether the node is Teredo capable when the "address translated" flag is set and the IPv4 network is usable.

11. The method as claimed in claim 10 further comprising a step of establishing an IPv6 in IPv4 tunnel with NAT traversal when the !'address translated" flag is set.

12. The method as claimed in claim 9 further comprising a step of determining whether the node is 6t04 capable when the "address translated" flag is not set and the IPv4 network is usable.

13. The method as claimed in claim 12 further comprising a step of determining whether the node has a 6to4 address.

14. The method as claimed in claim 13 further comprising a step of configuring a 6to4 address.

15. The method as claimed in claim 14 further comprising a step of determining whether there is a 6to4 relay configured and reachable through the IPv4 network.

16. The method as claimed in claim 9 further comprising a step of determining whether the node is ISATAP capable when the node is not 6to4 capable.

17. The method as claimed in claim 16 further comprising a step of determining whether the node has an ISATAP address.

18. The method as claimed in claim 17 further comprising a step of configuring an ISATAP address.

19. The method as claimed in claim 18 further comprising a step of determining whether there is an ISATAP router configured and reachable through the IPv4 network.

20. The method as claimed in claim 6 further comprising a step of determining whether the node is dual IP layer stack transition mechanism (DSTM) capable when the tunnel broker server is not found and the IPv6 network is usable.

21. The method as claimed in claim 20 further comprising a step of determining whether there is a DSTM server available in the IPv6 network when the program instructions determine that the node is DSTM capable.

22. The method as claimed in claim 21 further comprising a step of establishing an IPv4 in IPv6 tunnel through the IPv6 network to an IPv4 gateway using the DSTM server.

23. The method as claimed in claim 9 further comprising a step of determining whether the "address translated" flag is set when the IPv6 network is usable and the tunnel broker is found.

24. The method as claimed in claim 23 further comprising a step of establishing an IPv4 in IPv6 tunnel through the IPv6 network to an IPv4 gateway.

25. The method as claimed in claim 23 further comprising a step of establishing an IPv4 in IPv6 tunnel through the IPv6 network to an IPv4 gateway with network address translation traversal when the "address translated" flag is set.

26. An Internet Protocol (IP) network node for establishing and maintaining connectivity to both an Internet Protocol version 4 (IPv4) network and an Internet Protocol version 6 (IPv6) network, the IP network node comprising a computer readable storage medium storing program instructions for controlling the IP network node to perform the method of claim 1.

27. A computer readable storage medium storing middleware for an Internet Protocol (IP) network node, the middleware comprising executable code for controlling the IP network node to perform the method of claim 1.

* * * * *